(12) United States Patent
Cappuccini et al.

(10) Patent No.: US 11,780,010 B2
(45) Date of Patent: Oct. 10, 2023

(54) PROCESS FOR MAKING A COMPONENT OF A TURBOMACHINE, A COMPONENT OBTAINABLE THEREBY AND TURBOMACHINE COMPRISING THE SAME

(71) Applicant: NUOVO PIGNONE TECNOLOGIE SRL, Florence (IT)

(72) Inventors: Filippo Cappuccini, Florence (IT); Massimo Giannozzi, Florence (IT); Massimiliano Buccioni, Florence (IT); Domenico Di Pietro, Florence (IT)

(73) Assignee: Nuovo Pignone Technologie SRL, Florence (IT)

( * ) Notice: Subject to any disclaimer, the term of this patent is extended or adjusted under 35 U.S.C. 154(b) by 524 days.

(21) Appl. No.: 16/304,578

(22) PCT Filed: May 25, 2017

(86) PCT No.: PCT/EP2017/062716
§ 371 (c)(1),
(2) Date: Nov. 26, 2018

(87) PCT Pub. No.: WO2017/207414
PCT Pub. Date: Dec. 7, 2017

(65) Prior Publication Data
US 2019/0201972 A1    Jul. 4, 2019

(30) Foreign Application Priority Data
May 30, 2016    (IT) ........................ 102016000055824

(51) Int. Cl.
*B22F 1/00*    (2022.01)
*B22F 9/08*    (2006.01)
(Continued)

(52) U.S. Cl.
CPC .............. *B22F 5/009* (2013.01); *B22F 1/142* (2022.01); *B22F 9/082* (2013.01); *C21D 1/18* (2013.01);
(Continued)

(58) Field of Classification Search
CPC .......... C21D 6/004; C21D 1/18; B22F 1/0085
See application file for complete search history.

(56) References Cited

U.S. PATENT DOCUMENTS 4,765,956 A * 8/1988 Smith .................... C22C 19/05
420/445
5,945,067 A    8/1999 Hibner et al.
(Continued)

FOREIGN PATENT DOCUMENTS

CN        1726110 A    1/2006
CN        1914339 A    2/2007
(Continued)

OTHER PUBLICATIONS

PCT Search Report and Written Opinion issued in connection with corresponding Application No. PCT/EP2017/062716 dated Sep. 6, 2017.

Primary Examiner — Anthony M Liang
(74) Attorney, Agent, or Firm — Paul Frank + Collins P.C.

(57) ABSTRACT

Turbomachines, as well as their components, are disclosed being in the field of production and treatment of oil and gas containing e.g. hydrocarbon plus hydrogen sulfide, carbon dioxide, with or without other contaminants. The components are made of a high corrosion high temperature resistant alloy, capable of resisting to corrosion and/or stress at high temperature better than state of art martensitic stainless (Continued)

steels and behaving similarly to premium nickel base superalloys, and at the same time showing a very improved hardness value.

9 Claims, 6 Drawing Sheets

(51) Int. Cl.

| | |
|---|---|
| B22F 5/00 | (2006.01) |
| C22C 30/02 | (2006.01) |
| C21D 6/00 | (2006.01) |
| F01D 5/28 | (2006.01) |
| C21D 1/18 | (2006.01) |
| C22C 38/52 | (2006.01) |
| C22C 38/04 | (2006.01) |
| C21D 6/02 | (2006.01) |
| C22C 19/05 | (2006.01) |
| C22C 38/02 | (2006.01) |
| C22C 38/42 | (2006.01) |
| C22C 38/44 | (2006.01) |
| C22C 38/50 | (2006.01) |
| C22C 38/06 | (2006.01) |
| C22C 38/00 | (2006.01) |
| C22C 30/00 | (2006.01) |
| C22C 38/48 | (2006.01) |
| B22F 1/142 | (2022.01) |
| B22F 3/15 | (2006.01) |
| B22F 3/22 | (2006.01) |
| B22F 3/04 | (2006.01) |
| F04D 29/02 | (2006.01) |
| B22F 3/10 | (2006.01) |

(52) U.S. Cl.
CPC .............. *C21D 6/004* (2013.01); *C21D 6/02* (2013.01); *C22C 19/055* (2013.01); *C22C 19/056* (2013.01); *C22C 30/00* (2013.01); *C22C 30/02* (2013.01); *C22C 38/004* (2013.01); *C22C 38/02* (2013.01); *C22C 38/04* (2013.01); *C22C 38/06* (2013.01); *C22C 38/42* (2013.01); *C22C 38/44* (2013.01); *C22C 38/48* (2013.01); *C22C 38/50* (2013.01); *C22C 38/52* (2013.01); *F01D 5/28* (2013.01); *B22F 3/04* (2013.01); *B22F 3/10* (2013.01); *B22F 3/15* (2013.01); *B22F 3/225* (2013.01); *B22F 2301/35* (2013.01); *B22F 2998/10* (2013.01); *B22F 2999/00* (2013.01); *F04D 29/02* (2013.01); *F05D 2300/17* (2013.01)

(56) References Cited

U.S. PATENT DOCUMENTS

| | | | |
|---|---|---|---|
| 6,110,422 A * | 8/2000 | Suarez | C22C 19/058 |
| 2002/0005233 A1 | 1/2002 | Schirra | |
| 2016/0312341 A1 * | 10/2016 | Hattendorf | C22C 19/058 |
| 2018/0171456 A1 * | 6/2018 | Foroni | C22F 1/10 |

FOREIGN PATENT DOCUMENTS

| | | |
|---|---|---|
| CN | 101413410 A | 4/2009 |
| CN | 102492848 A | 6/2012 |
| EP | 0 136 998 A1 | 4/1985 |
| RU | 2 107 823 C1 | 3/1998 |
| RU | 2 235 798 C2 | 9/2004 |
| WO | 20150197751 A1 | 12/2015 |
| WO | WO 2015197751 A1 * | 12/2015 ............ B22F 5/009 |

* cited by examiner

PROCESS FOR MAKING A COMPONENT OF A TURBOMACHINE, A COMPONENT OBTAINABLE THEREBY AND TURBOMACHINE COMPRISING THE SAME

FIELD OF THE INVENTION

Embodiments of the subject matter disclosed herein relate in general to components for turbomachines and to turbomachines for "Oil & Gas" applications.

Some embodiments relate to (rotary) centrifugal compressors or pumps, as well as their components, operating in the field of production and treatment of oil and gas containing e.g. hydrocarbon plus hydrogen sulfide, carbon dioxide, with or without other contaminants. These materials are referred as "sour gas". Such apparatuses have at least one component made of a high corrosion resistant alloy, capable of resisting to corrosion better than state of art martensitic stainless steels and behaving similarly to premium nickel base superalloys.

Some embodiments relate to (rotary) gas turbines or steam turbines, as well as their components. Such apparatuses have at least one component made of a high mechanical resistant alloy, capable of resisting to fatigue and/or creep better than state of art materials.

BACKGROUND OF THE INVENTION

A compressor is a machine capable of raising the pressure of a compressible fluid (gas) through the use of mechanical energy. In centrifugal compressors, the compression of the fluid is carried out by one or more impellers assembled on a shaft with a rotating motion inside one or more stator parts (diaphragm) stacked together by bolts. The described assembly is normally called bundle. The fluid to be compressed is drawn into the bundle through one or more intake ducts, whereas the compressed fluid is expelled from the bundle towards one or more delivery ducts.

Commonly, the centrifugal compressors are actuated by electric motors or else by internal combustion engines, through a coupling for transmitting the motion.

Centrifugal compressors that operate in sour gas fields are subject to different type of interaction with the environment (corrosion) that can cause loss of performance and premature failure of compressor components.

The sour service is characterized by hydrocarbons with wet hydrogen sulphide ($H_2S$) where the $pH_2S$ is higher than 0.0030 bar. This value is valid for carbon and low alloy steels. NACE MR0175/ISO 15156-1 and NACE MR0175/ISO 15156-3 do not define a minimum $pH_2S$ limit for corrosion resistant alloys (CRAs), because this limit is a function also of acidity of the solution (pH) and the values can be lower than the one defined for carbon and low alloy steels.

There are several corrosion phenomena, where the following types are the most relevant:

General corrosion—an even attack of the surface of the material

Pitting corrosion—an uneven localized attack

Stress corrosion cracking (SCC and CSCC)

It is pointed out that corrosion phenomena listed above can only occur if condensed water is present (wet gas), that acts as electrolyte for electrochemical process.

Wet gas containing hydrocarbons, CO2, $H_2S$, and chlorides (or other halides) eventually in presence of elemental sulphur, represents an environment where all the phenomena listed above can occur. Resistance of material to single or combination of damage mechanisms is therefore fundamental in order to guarantee reliability of products.

Among the corrosion mechanism listed above, the most critical is the stress corrosion cracking either by wet $H_2S$ or chlorides (or in general halides), because it makes unavailable the unit for service.

In general, the mechanism involves the diffusion in the metal of hydrogen atoms generated by corrosion.

SSC can occur only if the following three conditions are verified:

Tensile stress (residual and/or applied)

$H_2S$+condensed water

Material prone to SSC damage

Contaminants such as halides, arsenic (As), antimony (Sb) and cyanides (CN—) act as catalyst, increasing the concentration of hydrogen atoms on surface and by preventing their recombination in hydrogen molecules making SSC more severe.

In general, centrifugal compressor components (impellers, shafts, diaphragms and bolts) are exposed to tensile stress and wet gas conditions.

Based upon experience, it has been found that the impellers and bolts constitute the most prone components to SSC and CSCC. This because the stress level is higher than in the other components and because the stress remains applied during compressor stops (pressurized) where a wet gas at higher partial pressure occurs. Therefore is mandatory, for sour service environments, to select materials that are able to withstand the severe environment conditions.

Material selection for such service is therefore based on a three dimensional space governed by partial pressure of $H_2S$ ($p(H_2S)$), pH (mainly function of $CO_2$), and chlorides (and/or other halides) content, as schematically represented in FIG. 1.

Up to now different materials have been used with the aim of selecting the most cost effective solution for the specified environment.

In order to simplify the complex rules behind material fit for purpose approach, the following principles cloud be considered:

For low $p(H_2S)$ any pH, and high chlorides content duplex and superduplex alloys are the class of material of choice;

For low to moderate $p(H_2S)$, any pH and low chlorides different classes of martensitic stainless steels are the class of material of choice;

For any $p(H_2S)$, any pH and high chlorides nickel based alloys are the class of material of choice;

Representing these principles above in the 3D space, it is clear that there is a huge space between cost effective alloys (i.e. duplex, superduplex and martensitic stainless steels) and premium nickel base alloys, that could be covered by new alloys.

Therefore, there is a need for components for centrifugal compressors in particular, but not exclusively on compressors operating in the field of production and treatment of oil and gas containing hydrocarbon plus hydrogen sulphide with or without other contaminants, capable of improving the reliability, increase the speed (given the higher specific strength of material) and provide a cost effective alloy by reducing expensive alloying elements, mainly nickel.

Similar problems need to be addressed in pump design and service conditions or in some steam turbine application (i.e. geothermal fields).

A gas turbine is a type of internal combustion engine. It has an upstream rotating compressor coupled to a downstream turbine, and a combustion chamber in-between.

Atmospheric air flows through a compressor is brought to higher pressure in a combustion chamber where it is mixed and burnt with fuel (i.e liquid or gas) to increase its enthalpy. This high-temperature high-pressure flow enters in an expansion turbine, producing a shaft work output in the process. The turbine shaft work is used to drive the compressor and other devices such as an electric generator that may be coupled to the shaft.

This environment is characterized by a combination of high temperature, high stress in steady and cycling conditions. Materials for such application shall be designed to withstand creep, low and high cycle fatigue, oxidation and corrosion. This is normally accomplished by high strength steels or nickel base alloys.

Similar problems need to be addressed in steam turbine design and service conditions.

The present Inventors have tried to achieve one or some or all of the above objects.

SUMMARY OF INVENTION

According to first exemplary embodiments, there is a process for making a component of a turbomachine, said process comprising the steps of:
melting an alloy chemical composition consisting of:

| | |
|---|---|
| C | 0.005-0.03 wt % |
| Si | 0.05-0.5 wt % |
| Mn | 0.1-1.0 wt % |
| Cr | 19.5-22.5 wt % |
| Ni | 34.0-38.0 wt % |
| Mo | 3.0-5.0 wt % |
| Cu | 1.0-2.0 wt % |
| Co | 0.0-1.0 wt % |
| Al | 0.01-0.5 wt % |
| Ti | 1.8-2.5 wt % |
| Nb | 0.2-1.0 wt % |
| W | 0.0-1.0 wt % | based on the composition weight, the remaining being Fe and impurities, said impurities comprising S 0.0-0.01 wt % and P 0.0-0.025 wt %,
through vacuum induction melting (VIM), or arc electric furnace, refining by Argon Oxygen Decarburization (A.O.D.), Vacuum Induction Degassing and Pouring (V.I.D.P), or Vacuum Oxygen Decarburization (V.O.D.), re-melting through electro-slag re-melting (E.S.R.), or vacuum arc re-melting (VAR), heat-treating the alloy resulting from step c) to induce solubilization through at least one heat cycle, at a temperature of 1020-1150° C., and followed by fast cooling in liquid or gas media, and ageing by heating to a temperature of 600-770° C. for 2-20 h, and cooling at room temperature.

According to second exemplary embodiments, there is a component of a turbomachine obtainable by the process above, the component being made of an alloy having a chemical composition consisting of:

| | |
|---|---|
| C | 0.005-0.03 wt % |
| Si | 0.05-0.5 wt % |
| Mn | 0.1-1.0 wt % |
| Cr | 19.5-22.5 wt % |
| Ni | 34.0-38.0 wt % |
| Mo | 3.0-5.0 wt % |
| Cu | 1.0-2.0 wt % |
| Co | 0.0-1.0 wt % |
| Al | 0.01-0.5 wt % |
| Ti | 1.8-2.5 wt % |
| Nb | 0.2-1.0 wt % |
| W | 0.0-1.0 wt % | based on the alloy weight, the remaining being Fe and impurities, said impurities comprising S 0.0-0.01 wt % and P 0.0-0.025 wt %, and
having a hardness value of 29-33HRC.

According to third exemplary embodiments, there is a turbomachine comprising at least one component as defined in general above.

BRIEF DESCRIPTION OF THE DRAWINGS

Embodiments of the present invention will become more apparent from the following description of exemplary embodiments to be considered in conjunction with accompanying drawings wherein.

DETAILED DESCRIPTION

Figure 1:
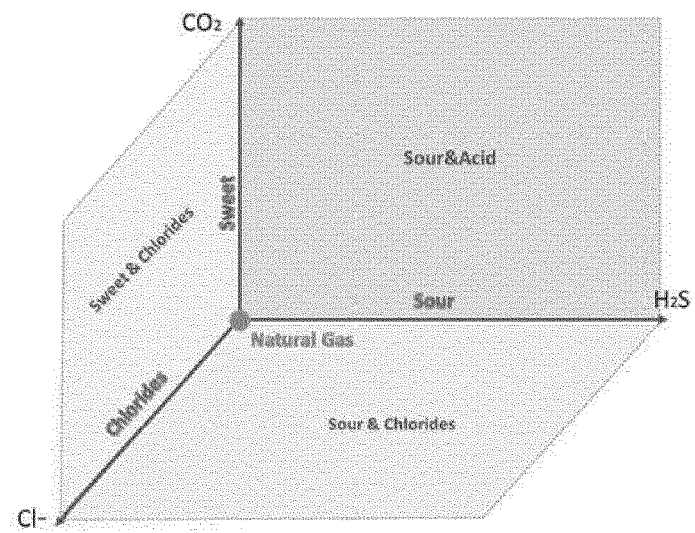
FIG. 1 shows a three dimensional space governed by partial pressure of $H_2S$ (p($H_2S$)), pH (mainly function of $CO_2$), and chlorides (and/or other halides) content.

The following description of exemplary embodiments refer to the accompanying drawings. The same reference numbers in different drawings identify the same or similar elements. The following detailed description does not limit embodiments of the invention. Instead, the scope of embodiments of the invention is defined by the appended claims.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

The term "room temperature" as used herein has its ordinary meaning as known to those skilled in the art and may include temperatures within the range of about 16° C. (60° F.) to about 32° C. (90° F.).

Regarding the alloy composition, the term "mandatory element" refers to an element that is present in the alloy and that, in combination with the other mandatory elements, allows to achieve the above objects. The mandatory elements in the alloy are Iron (Fe), Carbon (C), Silicon (Si), Manganese (Mn), Chromium (Cr), Nickel (Ni), Molybdenum (Mo), Copper (Cu), Aluminium (Al), Titanium (Ti), and Niobium (Nb).

The term "optional element" refers to an element that is possibly present in addition to the mandatory elements defining the essential chemical composition of the alloy. The optional elements in the alloy are: Cobalt (Co), and Tungsten (W).

The term "impurity" or "impurity element", instead, refers to an element not provided in the design of the alloy composition in order to reach the aforesaid objects. However, said element may be present because, depending on the manufacturing process, its presence may be unavoidable. Impurities in the alloy comprise phosphorous (P), Sulphur (S), Boron (B), Bismuth (Bi), Calcium (Ca), Magnesium (Mg), Silver (Ag), Lead (Pb), Nitrogen (N), Tin (Sn), and Oxygen (O).

In first embodiments, a process for making a component of a turbomachine comprises the steps of:
melting an alloy chemical composition consisting of:

| | |
|---|---|
| C | 0.005-0.03 wt % |
| Si | 0.05-0.5 wt % |
| Mn | 0.1-1.0 wt % |
| Cr | 19.5-22.5 wt % |
| Ni | 34.0-38.0 wt % |
| Mo | 3.0-5.0 wt % |
| Cu | 1.0-2.0 wt % |
| Co | 0.0-1.0 wt % |
| Al | 0.01-0.5 wt % |
| Ti | 1.8-2.5 wt % |
| Nb | 0.2-1.0 wt % |
| W | 0.0-1.0 wt % | based on the composition weight, the remaining being Fe and impurities, said impurities comprising S 0.0-0.01 wt % and P 0.0-0.025 wt %,
through vacuum induction melting (VIM), or arc electric furnace,
refining by Argon Oxygen Decarburization (A.O.D.), Vacuum Induction Degassing and Pouring (V.I.D.P), or Vacuum Oxygen Decarburization (V.O.D.),
re-melting through electro-slag re-melting (E.S.R.), or vacuum arc re-melting (VAR),
heat-treating the alloy resulting from step c) to induce solubilization through at least one heat cycle, at a temperature of 1020-1150° C., and followed by fast cooling in liquid or gas media, and
ageing by heating to a temperature of 600-770° C. for 2-20 h, and cooling at room temperature.

In this way, the presence of impurities, segregation thereof and in-homogeneities is significantly reduced and at the same time improved mechanical characteristics and corrosion resistance of the alloy are achieved.

Particularly, the selected ageing conditions as set in step e) allow to achieve very significant improvements in terms of hardness, while keeping very good the other characteristics, such as corrosion resistance and stress corrosion cracking resistance. In fact, as shown below, the resulting component of a turbomachine achieved a hardness value of 29-33HRC.

These hardness values lead to a very tough material with improved performance in particular in terms of sulphide Stress Corrosion Cracking resistance. Indeed the SSC resistance of CRAs increases lowering the hardness of the alloy. The ageing treatment described assures a high process capability in treating even high dimension forging products, targeting the hardness requirements detailed in NACE MR0175/ISO15156-3.

In preferred embodiments, the step e) of ageing is performed by heating to a temperature of 720-760° C. for 5-10 h, and cooling at room temperature.

In some embodiments, the process further comprises, before the step d), a step d') of homogenization of the alloy resulting from step c), at a temperature above 1100° C. for at least 6 hours.

In other embodiments, the process further comprises, before the step d) and after the step d'), a step d") of hot or cold plastic deformation through at least one plastic deformation cycle, in order to attain a minimum total reduction ratio of 2:1. Such plastic deformation cycles include forging (open or close die), rolling, extrusion, cold expansion, to produce a raw component shape or more generally a raw shape to be further machined to produce centrifugal compressor, pump, gas and steam turbine, as well as components thereof.

In other embodiments, the step d) of heat-treating to induce solubilization through at least one heat cycle, at a temperature of 1020-1150° C., can be carried out inside furnaces, under air, controlled atmosphere or vacuum, and followed by fast cooling in liquid or gas media, in order to put and keep in solution the alloying elements (i.e. copper, titanium, aluminium, niobium, etc. . . . ) for the subsequent heat treatment step.

In other embodiments, the alloy is further atomized to produce powder and then treated by powder metallurgy. In an embodiment, with the term "powder metallurgy" it is meant that said powder is consolidated by Cold Isostatic Pressing (CIP), by Metal Injection Moulding (MIM), Sintering, Hot Isostatic Pressing (HIP), or fabricated by MIM and exposed to a HIP process. Basically, powders are fed into a die, compacted to a desired shape. The pressed powder is then sintered or hipped in a controlled atmosphere furnace at room or high pressure to produce metallurgical bonds among powder particles. Optional post-sintering operations, such as isothermal forging, infiltration, finish machining or surface treatment, may then be applied to complete the component.

In second embodiments, a component of a turbomachine is obtainable by the process as above described, the component being made of an alloy having a chemical composition consisting of:

| | |
|---|---|
| C | 0.005-0.03 wt % |
| Si | 0.05-0.5 wt % |
| Mn | 0.1-1.0 wt % |
| Cr | 19.5-22.5 wt % |
| Ni | 34.0-38.0 wt % |
| Mo | 3.0-5.0 wt % |
| Cu | 1.0-2.0 wt % |
| Co | 0.0-1.0 wt % |
| Al | 0.01-0.5 wt % |
| Ti | 1.8-2.5 wt % |
| Nb | 0.2-1.0 wt % |
| W | 0.0-1.0 wt % | based on the alloy weight, the remaining being Fe and impurities, said impurities comprising S 0.0-0.01 wt % and P 0.0-0.025 wt %, and having a hardness value of 29-33HRC.

Owing to its high resistance to corrosion (even at high temperature) and/or to its high resistance to fatigue and/or creep, the component is very useful, in particular it is very useful for components that get in touch with the working fluid of the turbomachine, while showing at the same time a very advantageous hardness value.

In fact, said alloy is high corrosion and high temperature resistant, thus capable of resisting to corrosion and/or stress at high temperature better than state of art martensitic stainless steels and behaving similarly to premium nickel base superalloys like those complying the requirements of UNS N07718 e UNS N00625, but at the same time the process for making the component as above described allowed the alloy to achieved a desirable hardness value of 29-33HRC.

In preferred embodiments, the alloy has a high resistance to corrosion at a high temperature, in particular in the range of 200-250° C.

In other preferred embodiments, the alloy has a high resistance to fatigue and/or creep at a high temperature, in particular in the range of 400-700° C.

In an embodiment, the alloy has a chemical composition consisting of:

| | |
|---|---|
| C | 0.005-0.02 wt % |
| Si | 0.05-0.2 wt % |
| Mn | 0.1-0.6 wt % |
| Cr | 20.0-21.5 wt % |
| Ni | 35.0-37.0 wt % |
| Mo | 3.5-4.0 wt % |
| Cu | 1.2-2.0 wt % |
| Co | 0.0-0.2 wt % |
| Al | 0.05-0.4 wt % |
| Ti | 1.9-2.3 wt % |
| Nb | 0.2-0.5 wt % |
| W | 0.0-0.6 wt % |
| Fe | at least 30 wt % | based on the alloy weight, the remaining being impurities, said impurities comprising S 0.0-0.001 wt % and P 0.0-0.02 wt %.

More particularly, the alloy has a chemical composition consisting of:

| | |
|---|---|
| C | 0.005-0.02 wt % |
| Si | 0.06-0.15 wt % |
| Mn | 0.2-0.4 wt % |
| Cr | 20.2-21.0 wt % |
| Ni | 36.0-36.5 wt % |
| Mo | 3.6-3.8 wt % |
| Cu | 1.3-1.7 wt % |
| Co | 0.0-0.1 wt % |
| Al | 0.1-0.3 wt % |
| Ti | 2.0-2.2 wt % |
| Nb | 0.25-0.4 wt % |
| W | 0.01-0.4 wt % |
| Fe | at least 30 wt % | based on the alloy weight, the remaining being impurities, said impurities comprising S 0.0-0.001 wt % and P 0.0-0.015 wt %.

The above alloy is a cost effective alloy, which at the same time surprisingly encompasses a reduced amount of expensive alloying elements, such as mainly nickel, but also chromium, molybdenum and titanium, without negatively affecting the mechanical and anticorrosion properties. Said alloy also shows a great resistance to high temperatures and pressures, so that the components made of the same result to be suitable for turbomachines, particularly centrifugal compressors.

Said impurities are P, S, B, Bi, Ca, Mg, Ag, Pb, N, Sn, O or a combination thereof.

In an embodiment, said impurities are less than 0.5 wt %; more particularly, less than 0.2 wt %.

In preferred embodiments, said impurities are P up to 0.025 wt %, S up to 0.01 wt %, B, Bi, Ca, Mg, Ag, Pb, N, Sn, and O.

In particularly preferred embodiments, the alloy has a chemical composition consisting of:

| | |
|---|---|
| C | 0.015 wt % |
| Si | 0.09 wt % |
| Mn | 0.3 wt % |
| Cr | 20.4 wt % |
| Ni | 36.2 wt % |
| Mo | 3.7 wt % |
| Cu | 1.41 wt % |
| Co | 0.03 wt % |
| Al | 0.25 wt % |
| Ti | 2.04 wt % |
| Nb | 0.27 wt % |
| W | 0.1 wt % |
| Fe | balance | having the following impurities:

| | |
|---|---|
| P | up to 0.013 wt % |
| S | up to 0.0002 wt % |
| B | up to 0.003 wt % |
| Bi | up to 0.3 ppm |
| Ca | up to 50 ppm |
| Mg | up to 30 ppm |
| Ag | up to 5 ppm |
| Pb | up to 5 ppm |
| N | up to 100 ppm |
| Sn | up to 50 ppm |
| O | up to 50 ppm |

In some embodiments, the alloy has a grain size finer than plate 3 as per ASTM E112.

Owing to the above described chemical composition, level of impurities, grain size resulting from the process conditions, the alloy shows the following properties:
superior hardness properties,
superior anticorrosion characteristics in terms of general and localized corrosion, threshold stress in solution A method A as per NACE MR0175, higher Stress Corrosion Cracking (SCC) resistance, higher Chloride Stress Corrosion Cracking (CSCC), Sulphide Stress Cracking (SSC), Galvanically-induced Hydrogen Stress Cracking (GHSC);
higher tensile properties at room and high temperature;
suitable toughness properties;
higher high and low cycle fatigue properties;
higher creep strength;
higher oxidation and hot corrosion resistance;
with respect to stainless steels (martensitic, ferritic, austenitic and austenitic-ferritic) and comparable to premium nickel base superalloys.

In thirds embodiments, a turbomachine comprises at least one component as defined in general above.

In preferred embodiments, the turbomachine is a centrifugal compressor or a centrifugal pump.

In other preferred embodiments, the turbomachine is a gas turbine or a steam turbine.

Figure 2:
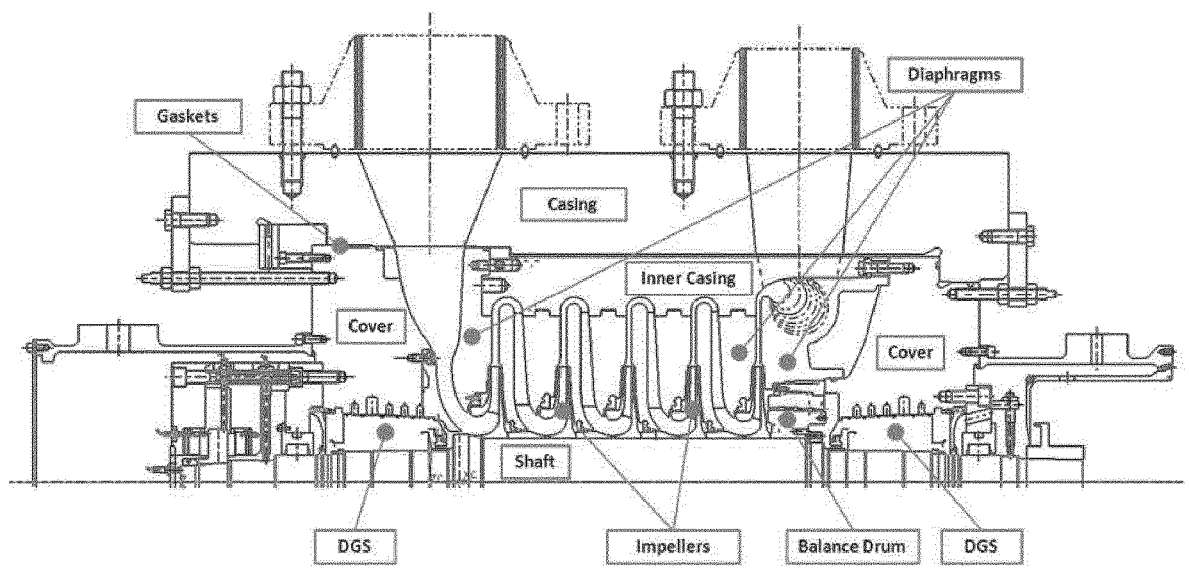
FIG. 2 shows a typical cross section of centrifugal compressor.
Figure 3:
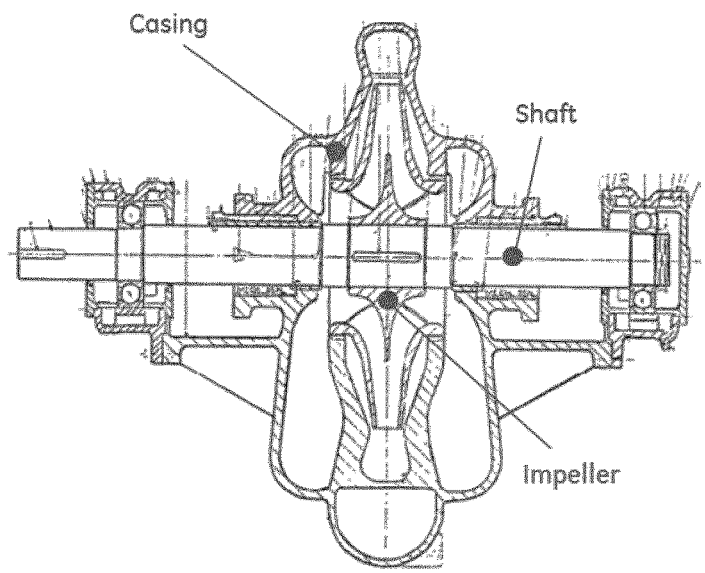
FIG. 3 shows a typical cross section of centrifugal pump.
Figure 4:
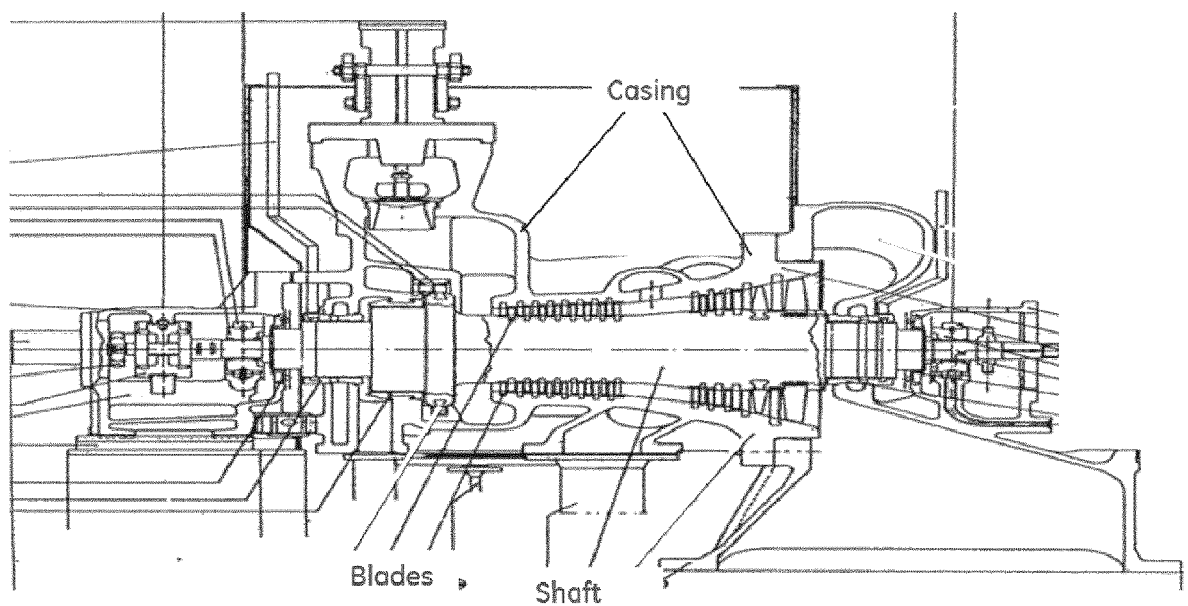
FIG. 4 shows a typical cross section of a steam turbine.
Figure 5:
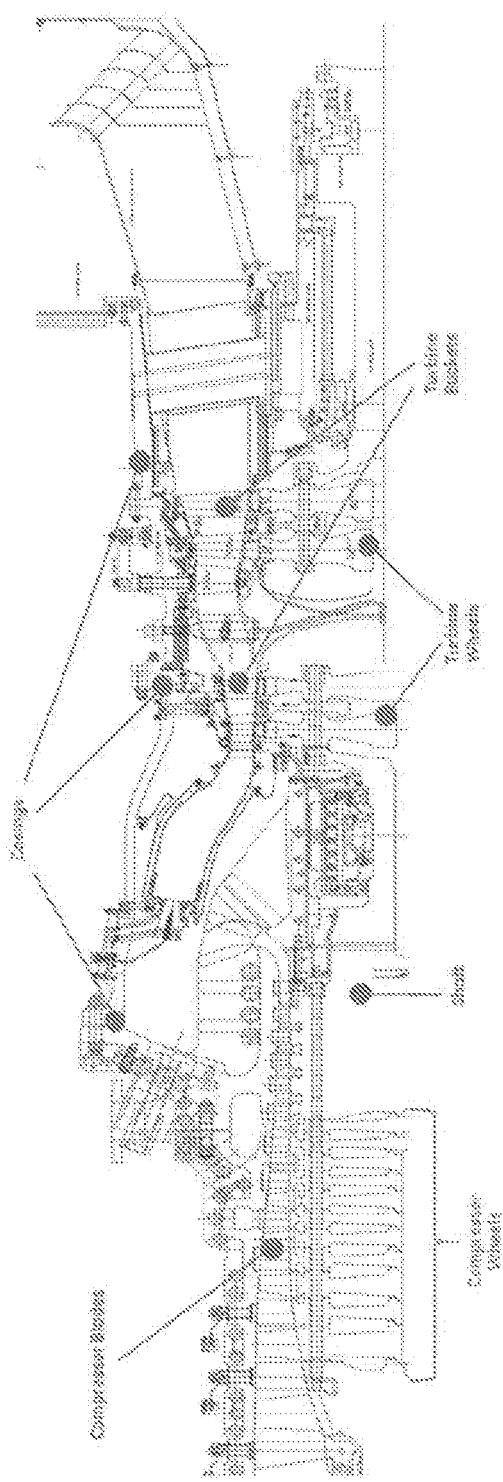
FIG. 5 shows a typical cross section of a gas turbine.

FIGS. 2, 3, 4 and 5 show different turbomachines where one or more components as set out above may be used. FIG. 2 shows a typical cross section of centrifugal compressor, FIG. 3 shows a typical cross section of centrifugal pump, FIG. 4 shows a typical cross section of a steam turbine, and FIG. 5 shows a typical cross section of a gas turbine.

It should be understood that all aspects identified as preferred and advantageous for the alloy component are to be deemed as similarly preferred and advantageous also for the process for making thereof as well as for the turbomachine comprising the same.

It should be also understood that all the combinations of preferred aspects of the alloy component, and process for making thereof, as well as their uses in gas turbine applications, as above reported, are to be deemed as hereby disclosed.

EXAMPLES

Example 1

An alloy has been prepared having the following composition:

| | | |
|---|---|---|
| C | 0.015 | wt % |
| Si | 0.09 | wt % |
| Mn | 0.3 | wt % |
| Cr | 20.4 | wt % |
| Ni | 36.2 | wt % |
| Mo | 3.7 | wt % |
| Cu | 1.41 | wt % |
| Co | 0.03 | wt % |
| Al | 0.25 | wt % |
| Ti | 2.04 | wt % |
| Nb | 0.27 | wt % |
| W | 0.1 | wt % |
| Fe | balance | | having the following impurities:

| | |
|---|---|
| P | up to 0.013 wt % |
| S | up to 0.0002 wt % |
| B | up to 0.003 wt % |
| Bi | up to 0.3 ppm |
| Ca | up to 50 ppm |
| Mg | up to 30 ppm |
| Ag | up to 5 ppm |
| Pb | up to 5 ppm |
| N | up to 100 ppm |
| Sn | up to 50 ppm |
| O | up to 50 ppm |

The above chemical composition was melted through vacuum induction melting (VIM), refined by Argon Oxygen Decarburization (A.O.D.), and re-melted re-melting through electro-slag re-melting (E.S.R.).

The resulting alloy was homogenized at a temperature above 1100° C. for at least 6 hours.

The alloy was then subjected to two cycles of hot plastic deformation.

Subsequently, the alloy was subjected to a heat treatment to induce solubilization at a temperature of 1020-1150° C., followed by fast cooling in liquid or gas media.

Finally, the alloy has been subjected to an ageing treatment by heating to a temperature of about 750° C. for 6 h, and cooling at room temperature.

The resulting alloy has been tested to assess mechanical and anticorrosion properties. The results have been compared to a known Martensitic Stainless Steel (shortly 'Martensitic SS') in the following Table 1. Martensitic stainless steels are a class of stainless steels characterized by Chromium content between 12-18 wt %, low Nickel and a crystalline structure defined as Martensite. This class of alloys has medium-high mechanical properties and a fair corrosion resistance.

TABLE 1

| Corrosion Characteristic | Typical Martensitic SS | Alloy of Example 1 |
|---|---|---|
| Critical Pitting Temperature (CPT)AST G48 method C [° C.] | 0 ÷ 5° C. | 30 ÷ 40° C. |
| Sulphide Stress Corrosion (SSC) Threshold in NACE TM0177 Solution A method A [MPa] | 250 ÷ 300 MPa (<50% AYS) | 750 ÷ 800 Mpa (>95% AYS) |
| Chloride Stress Corrosion Cracking ASTM G123 | Failure <300 h | Passed ≥1000 h |

Additional verified SSC properties are reported in Table 2 and Table 3.

TABLE 2

| | Method | pH$_2$S | pH | Chlorides | Stress | Temperature | Result |
|---|---|---|---|---|---|---|---|
| Alloy of Example 1 | NACE TM0177 Method A Solution C | 10 bar | 3 | 25% NaCl | 750 MPa | 25° C. | Passed (>720 h) |
| | | 10 bar | 3 | 25% NaCl | 750 MPa | 150° C. | Passed (>720 h) |

TABLE 3

| Characteristics | High Temperature Martensitic SS | Alloy of Example 1 |
|---|---|---|
| Stress Rupture Tensile @600° C. | 600° C., 240 Mpa, 140 hrs 430 MPa | 600° C., 690 Mpa, 140 hrs 550 Mpa |
| Impact Charpy - V notch | 27J @−15° C. | 27J @−101° C. |

The alloying elements' weight percent is tailored to avoid or minimizing topologically closed packed phases (TCP). Excessive quantities of Cr, Mo, W would promote the precipitation of intermetallic phases which are rich in these elements. Generally speaking, the TCP phases have chemical formulae $A_xB_y$. For example, the μ phase is based on the ideal stoichiometry $A_6B_7$ and has a rhombohedral cell containing 13 atoms, such as $W_6Co_7$ and $Mo_6Co_7$.

The σ phase is based upon the stoichiometry $A_2B$ and has a tetragonal cell containing 30 atoms, such as $Cr_2Ru$, $Cr_{61}Co_{39}$ and $Re_{67}Mo_{33}$.

The P phase, for example, $Cr_{18}Mo_{42}Ni_{40}$ is primitive orthorhombic, containing 56 atoms per cell.

Figure 6A:
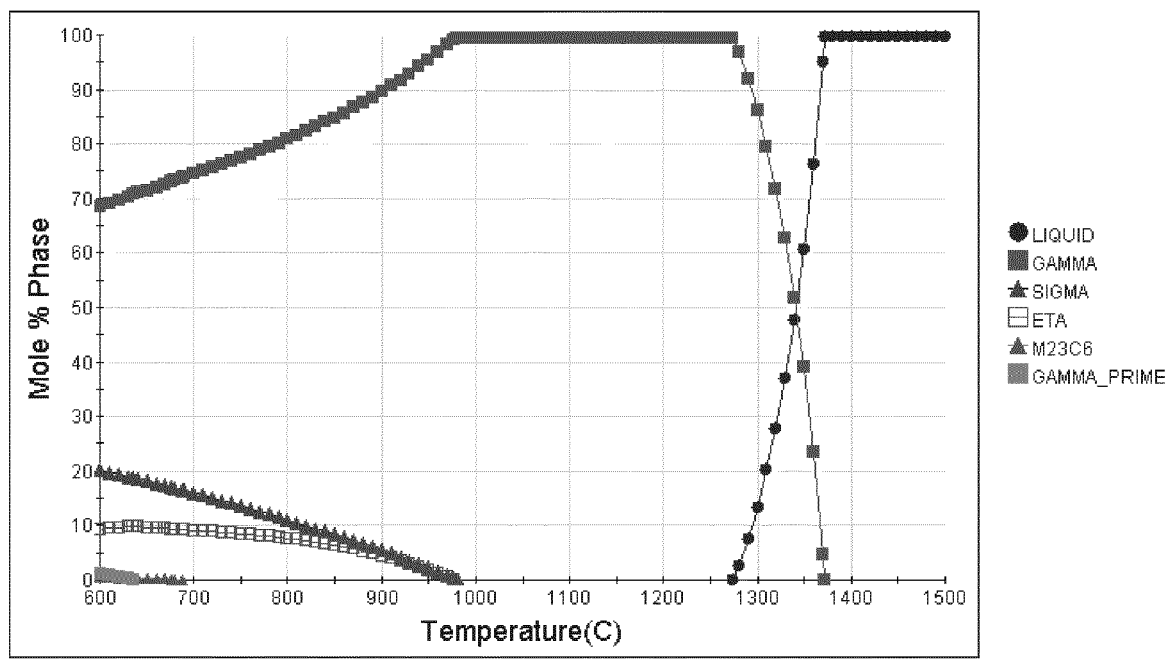
FIG. 6A shows the phase equilibrium vs temperature of the alloy of Example 1 and FIG. 6B shows the phase equilibrium vs temperature of the comparative UNS N07718.

As it is shown in FIGS. 6A (thermodynamic equilibrium) and 7A (kinetics estimation), only σ phase is thermodynamically possible and precipitation kinetics is so slow that neither during solution annealing, nor during ageing can happen.

Figure 6B:
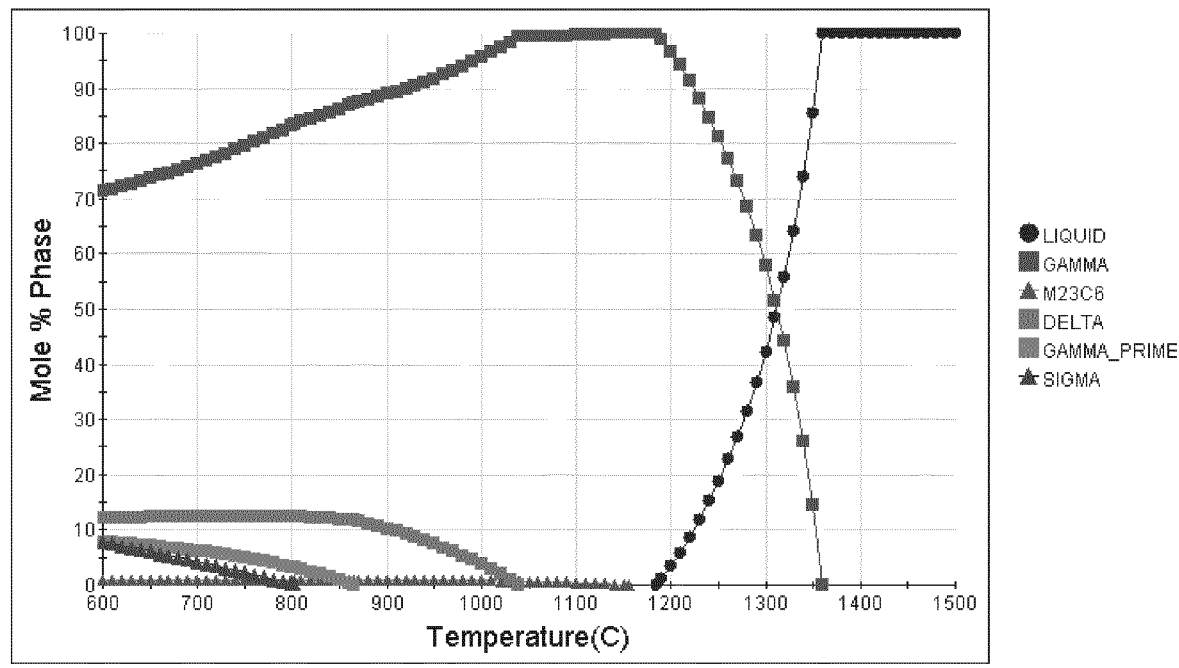
Figure 7A:
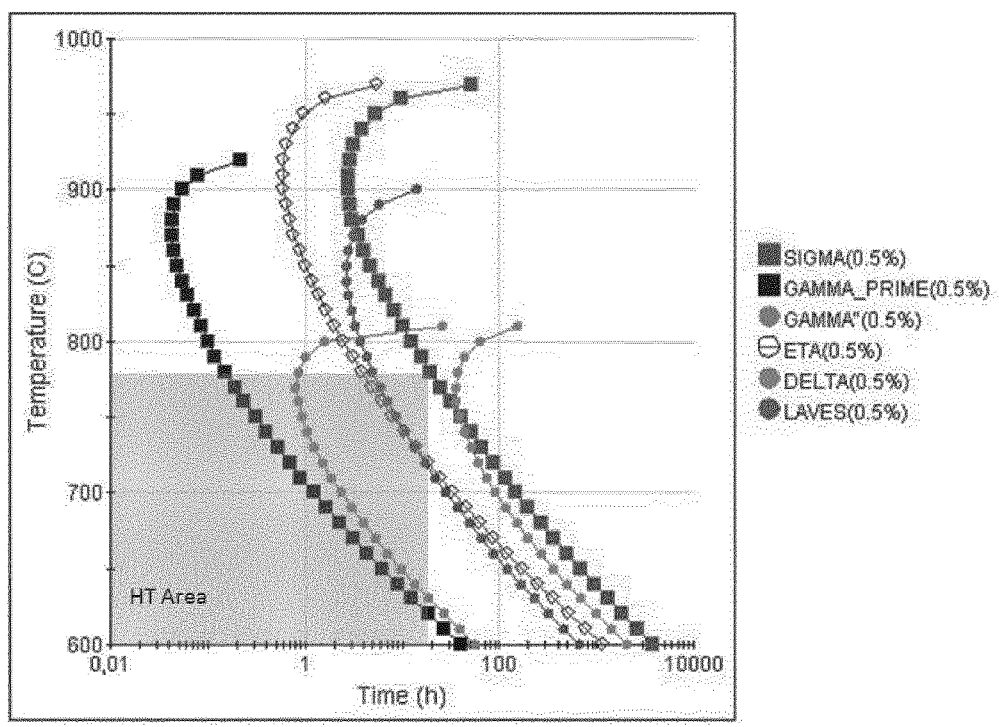
FIG. 7A shows the Time Temperature Transformation curves for the alloy of Example 1 and FIG. 7B shows the Time Temperature Transformation curves for the comparative UNS N07718.
Figure 7B:
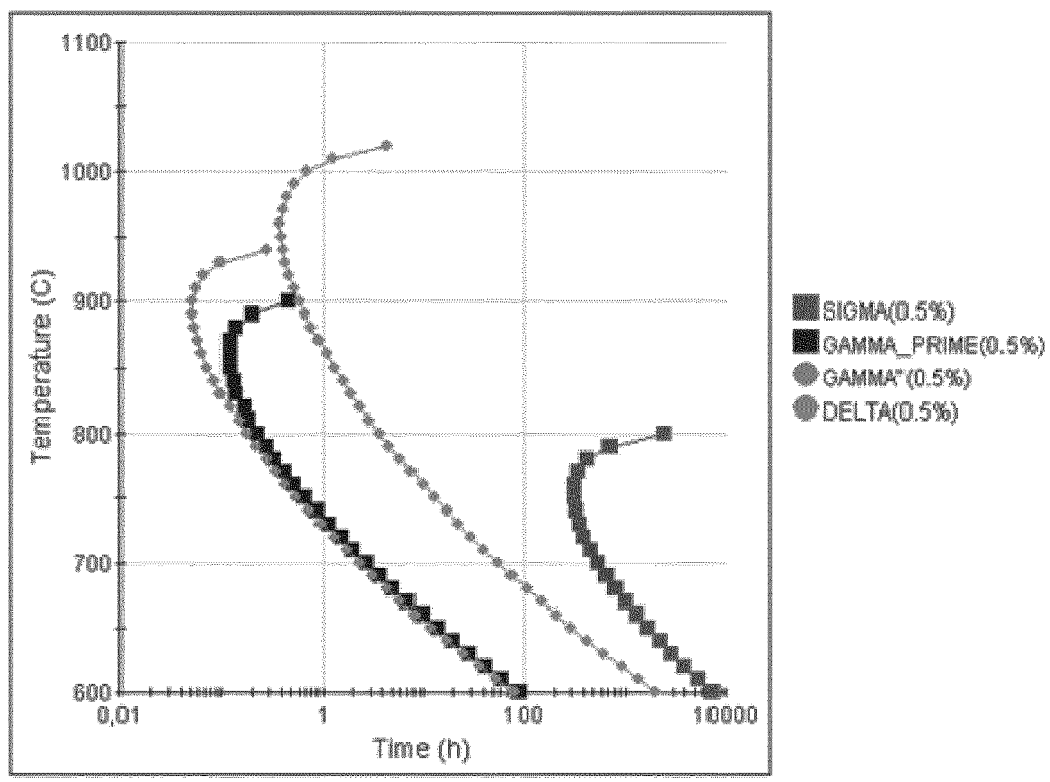

The chemical composition of this alloy is optimized to enlarge the hot workability window. This is accomplished by a low nickel content and reducing the temperature of precipitation of hardening secondary phases (gamma prime). As it can be seen in FIG. 6, the theoretic workability range at equilibrium is quite large and is between 1020° C. and 1280° C. This interval is larger than those provided by UNS N07718 (FIGS. 6B and 7B).

Equilibrium intervals do not take into account kinetics and visco-plastic phenomena, but can give an idea of how much better this alloy behaves in comparison with other well known commercial premium nickel base alloys.

Practically, this alloy has a hot forming range between 900°-1200° C., thus reducing the risk of failure during production and cycle time.

The alloy has a combination of chemical elements so as to provide secondary phases hardening such as to provide a minimum yield strength of 750 Mpa with a hardness value of 29-33HRC thus enhancing stress corrosion properties.

Figure 8:
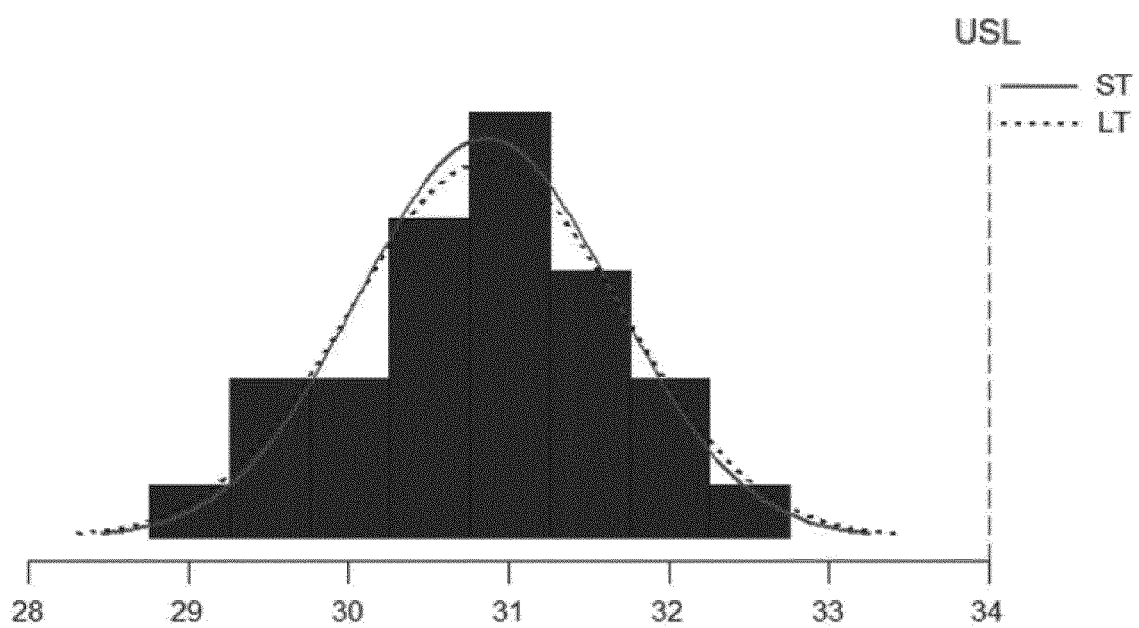
FIG. 8 shows the hardness process capability for the alloy of Example 1, wherein 'ST' means short-term standard deviation, 'LT' means long-term standard deviation, and 'USL' means upper specification limit.

In fact, with reference to FIG. 8, the hardness process capability for the alloy of Example 1 is shown, as having tested 30 samples of the alloy above at 750° C. for 6 h. The diagram of FIG. 8 shows that the mean of hardness value obtained in 30.86HRC.

The reduced hardness level results in a better machining if compared with premium nickel based alloys like UNS N07718. This level of hardness allows the turbomachinery components to be machined in aged conditions resulting in an optimization of manufacturing cycle if compared with premium nickel based alloys like UNS N07718. FIG. 7A shows the Time Temperature Transformation curves for the alloy of Example 1 and FIG. 7B shows the Time Temperature Transformation curves for the comparative UNS N07718. It is clear to see how the precipitation of deleterious phases (i.e. delta phase and sigma phase) are slower in the presented alloy with respect to UNS N07718. This allows to have a wide area of heat treatment and a cleaner microstructure, less sensitive to embrittlement and low toughness properties.

This alloy is designed to be easy welded by common arc welding processes (SMAW and GTAW) with homologous or different nickel base filler materials like UNS N06625, UNS N07725, or UNS N09925.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A process for making a component of a turbomachine, the process comprising the steps of:
 a) melting an alloy chemical composition consisting of:

| | |
|---|---|
| C | 0.005-0.03 wt % |
| Si | 0.05-0.5 wt % |
| Mn | 0.1-1.0 wt % |
| Cr | 19.5-22.5 wt % |
| Ni | 34.0-38.0 wt % |
| Mo | 3.0-5.0 wt % |
| Cu | 1.0-2.0 wt % |
| Co | 0.0-1.0 wt % |
| Al | 0.01-0.5 wt % |
| Ti | 1.8-2.5 wt % |
| Nb | 0.2-1.0 wt % |
| W | 0.0-1.0 wt % | based on the composition weight, the remaining being Fe and impurities, the impurities comprising S 0.0-0.01 wt % and P 0.0-0.025 wt %, through vacuum induction melting (VIM), or arc electric furnace,
 b) refining by Argon Oxygen Decarburization (A.O.D.), Vacuum Induction Degassing and Pouring (V.I.D.P), or Vacuum Oxygen Decarburization (V.O.D.),
 c) re-melting through electro-slag re-melting (E.S.R.), or vacuum arc re-melting (VAR),
 d) heat-treating the alloy resulting from step c) to induce solubilization through at least one heat cycle, at a temperature of 1020-1150° C., and followed by fast cooling in liquid or gas media, and
 e) ageing by heating to a temperature of 600-700° C. for 2-20 h, and
 f) immediately cooling the alloy resulting from step e) at room temperature.

2. The process of claim 1, further comprising, before the step d), a step d') of homogenization of the alloy resulting from step c), at a temperature above 1100° C. for at least 6 hours.

3. The process of claim 2, further comprising, before the step d) and after the step d'), a step d") of hot or cold plastic deforming through at least one plastic deformation cycle.

4. The process of claim 1, wherein the resulting alloy is further atomized to produce powder and then treated by a powder metallurgy process selected from Cold Isostatic Pressing (CIP), Metal Injection Molding (MIM), sintering, Hot Isostatic Pressing (HIP), or MIM and HIP process.

5. A process for making a component of a turbomachine, the process consisting of the steps of:
 a) melting an alloy chemical composition comprising:

| | |
|---|---|
| C | 0.015 wt % |
| Si | 0.09 wt % |
| Mn | 0.3 wt % |
| Cr | 20.4 wt % |
| Ni | 36.2 wt % |
| Mo | 3.7 wt % |
| Cu | 1.41 wt % |
| Co | 0.03 wt % |
| Al | 0.25 wt % |
| Ti | 2.04 wt % |
| Nb | 0.27 wt % |
| W | 0.1 wt % |
| Fe | balance | having the following impurities:

| | |
|---|---|
| P | up to 0.013 wt % |
| S | up to 0.0002 wt % |
| B | up to 0.003 wt % |
| Bi | up to 0.3 ppm |
| Ca | up to 50 ppm |
| Mg | up to 30 ppm |
| Ag | up to 5 ppm |
| Pb | up to 5 ppm |
| N | up to 100 ppm |
| Sn | up to 50 ppm |
| O | up to 50 ppm | based on the composition weight, through vacuum induction melting (VIM), or arc electric furnace,
b) refining by Argon Oxygen Decarburization (A.O.D.), Vacuum Induction Degassing and Pouring (V.I.D.P), or Vacuum Oxygen Decarburization (V.O.D.),
c) re-melting through electro-slag re-melting (E.S.R.), or vacuum arc re-melting (VAR),
d) heat-treating the alloy resulting from step c) to induce solubilization through at least one heat cycle in a vacuum, at a temperature of 1020-1150° C., and followed by fast cooling in liquid or gas media, and
e) ageing the alloy resulting from step d) by heating to a temperature of 750° C. for 6 h, and
f) immediately cooling the alloy resulting from step e) at room temperature.

6. The process of claim 5, further comprising deforming the alloy resulting from step c) via two hot plastic deformation cycles.

7. The process of claim 5, wherein the alloy resulting from step f) has a critical pitting temperature between 30° C. and 40° C.

8. The process of claim 5, wherein the alloy resulting from step f) has a sulfide stress corrosion threshold between 750 Mpa and 800 Mpa.

9. The process of claim 5, wherein the alloy resulting from step f) has a tensile strength at 600° C. of 550 Mpa.

* * * * *